United States Patent [19]

Snelling

[11] Patent Number: 4,822,078
[45] Date of Patent: Apr. 18, 1989

[54] HOSE COUPLING

[75] Inventor: Peter J. Snelling, Adelaide, Australia
[73] Assignee: Vinidex Tubemakers Pty. Limited, Australia
[21] Appl. No.: 10,130
[22] PCT Filed: May 6, 1986
[86] PCT No.: PCT/AU86/00125
   § 371 Date: Jan. 5, 1987
   § 102(e) Date: Jan. 5, 1987
[87] PCT Pub. No.: WO86/06814
   PCT Pub. Date: Nov. 20, 1986
[30] Foreign Application Priority Data May 6, 1985 [AU] Australia .......................... PH00444

[51] Int. Cl.⁴ ........................................... F16L 17/02
[52] U.S. Cl. ................................. 285/110; 285/320; 285/340; 285/423
[58] Field of Search ............... 285/340, 319, 320, 423, 285/110

[56] References Cited

U.S. PATENT DOCUMENTS 3,249,373 5/1966 Goldstein .................. 285/423 X
4,637,618 1/1987 Valls ............................ 285/110 X

FOREIGN PATENT DOCUMENTS 1207151 2/1960 France ........................ 285/110
1029123 5/1966 United Kingdom ................ 285/340

Primary Examiner—Dave W. Arola
Attorney, Agent, or Firm—Oldham & Oldham

[57] ABSTRACT

A hose coupling which has an integrally moulded lip which has an innermost surface defining a frusto-conical shape and a portion of reduced thickness to provide for pivoting freedom of the lip to effect both a grip and seal of a hose that can be inserted therethrough. The lip has axially extending tails which are segmented allowing for expansion or contraction as necessary of the lip but providing a limit to the pivotal freedom of such lip.

15 Claims, 2 Drawing Sheets

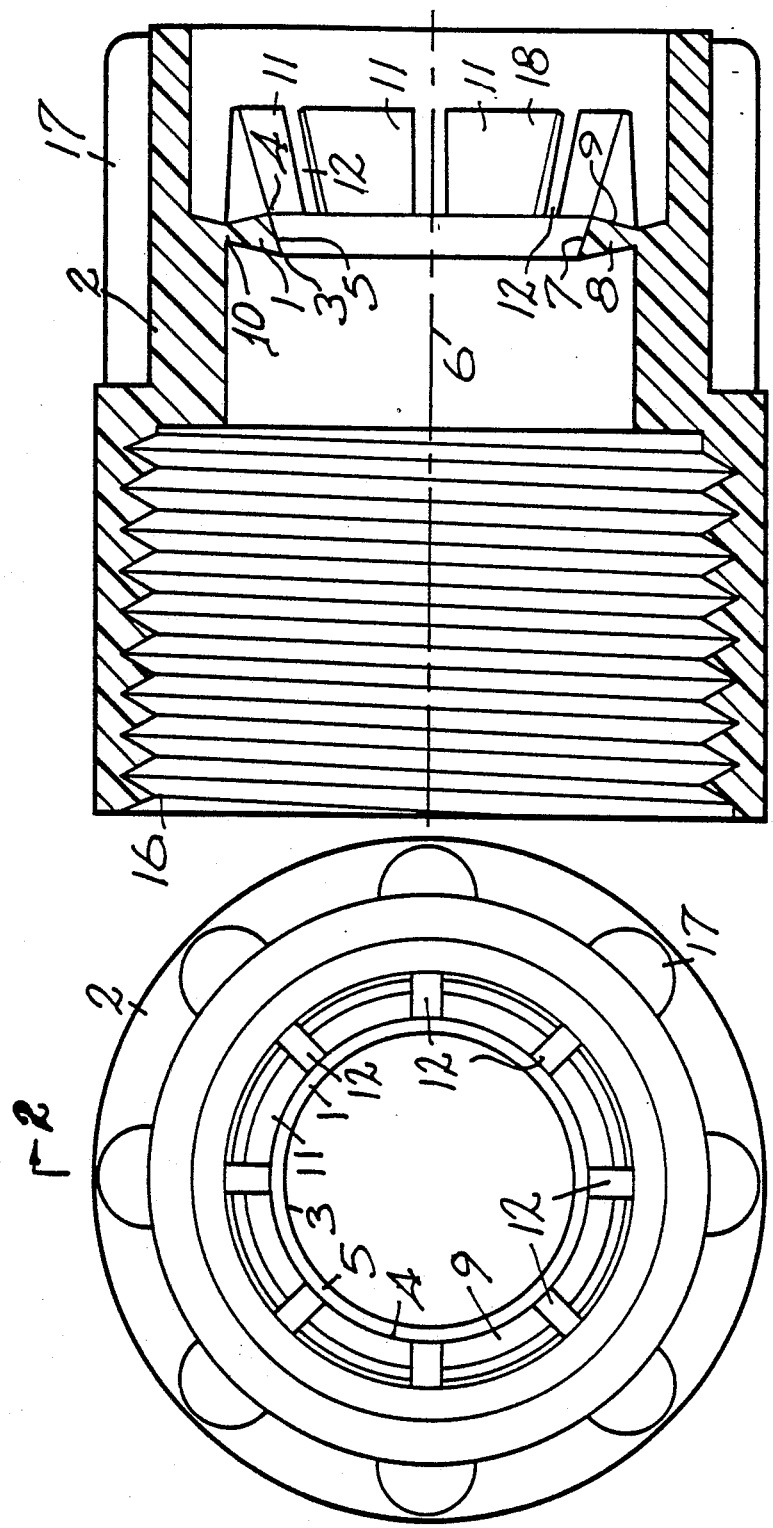

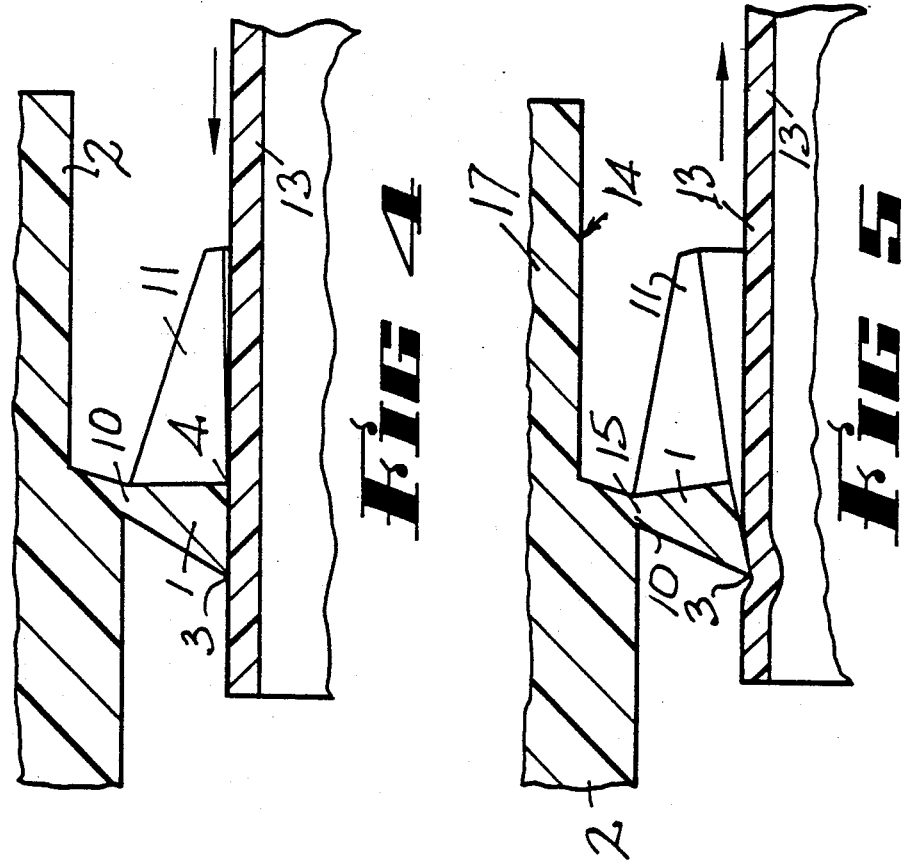
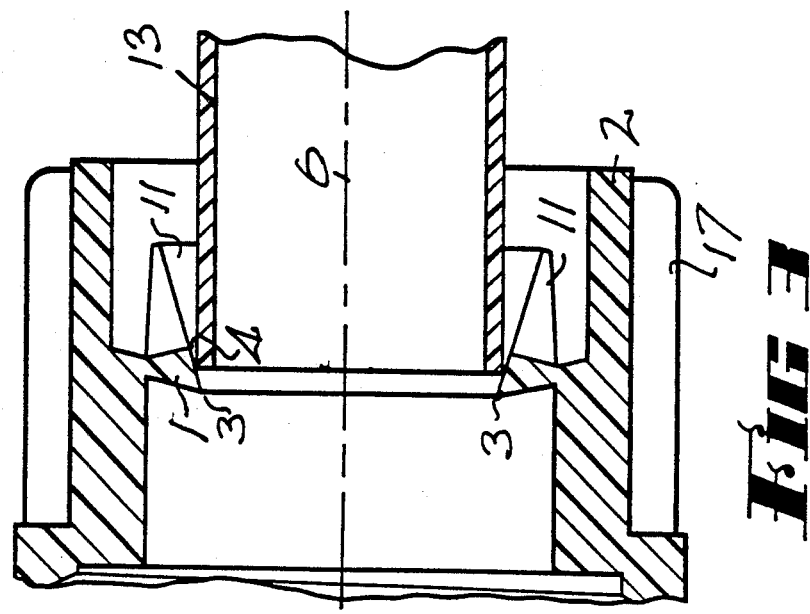

HOSE COUPLING

This invention relates to a fitting intended to provide a sealing connection between a tube and the fitting.

This can variously be described as a hose coupling or a fitting.

The problem to which this invention is directed is to provide a fitting of this type which can provide both a liquid seal and means for holding the tube within the fitting where the fitting as a whole is an integral moulding.

The invention can accordingly be said to reside in a fitting facilitating a sealing connection with a tube to provide a liquid seal, the fitting having an aperture to receive a tube therein, the fitting being comprised of a plastics material and having a circumferentially continuous inwardly extending lip integral with the housing of the fitting, the lip being attached to the housing by a portion of reduced thickness and adapted thereby and by the position of such reduced thickness portion, to be pivotal about such portion of reduced thickness.

In preference the lip has an innermost face which is of continuous constant shape.

In preference the fitting is integrally formed of a plastics material of a type such that the portion of reduced thickness will provide a pivotal effect for the inner portion of the lip while being sufficiently stiff to substantially resist deformation about any axis radially aligned with respect to the fitting, while being able to expand and contract circumferentially. By having the lip having a cross-sectional shape of a wedge, provides for this feature of being able to resist buckling deformation, while at the same time being able to expand and contract circumferentially in concert with pivotal action about the portion of reduced thickness.

In order to limit the extent to which the pivotal action can extend, there are provided a plurality of segmented tails secured to the lip.

By appropriate selection of the shape of the lip, the location and shape of the tails, and these in conjunction both with the plastics type and the shape and type of tube to be secured, it has been found that a very excellent fitting being a one off integral mould, can be provided which can provide both an effective liquid seal as well as strong mechanical engagement especially when there is internal liquid pressure which can have the effect of causing the lip to engage more strongly the external surface of the gripped tube.

Significant savings are made because there is no subsequent assembly necessary, for instance, a sealing ring or a tightening ring as has hitherto been necessary. Furthermore, in use, the tube needs only to be inserted into the fitting to be secured thereto. This can provide significant savings in respect of the time taken to install an irrigation system.

For a better understanding of the invention it will now be described with respect to the preferred embodiment which shall be described with the assistance of drawings in which :

FIG. 1 is an end view of a fitting according to the embodiment;

FIG. 2 is a cross-sectional view along lines 2—2 of FIG. 1;

FIG. 3 is the same view of the fitting as in FIG. 2 incorporating, however, an approaching tube;

FIG. 4 is a detail from FIG. 3 showing the arrangement upon further entry of the tube; and FIG. 5 is the same detail as in FIG. 4 showing the arrangement upon an expected attempt to withdraw the tube and when under liquid pressure.

Referring in detail to the drawings, a lip 1 is shown as a peripheral portion within the fitting 2 having an innermost sharp corner at 3 which is of lesser diameter than an outermost corner at 4.

The shape of the lip 1 is continuous and consistent around the annular path and provides there a continuous inner face defining a frusto-concial area at 5.

The fitting 2 is intended for a tube of circular cross-section and accordingly has itself a circular cross-section having a central axis at 6.

The lip 1 has an inner face at 7 inclined at 18° to the axis 6. The sides of the lip 1 at 8 and 9 are inclined at 75° to the axis 6.

There is a portion of reduced thickness at 10 which thereby connects the lip 1 to the housing 2, the thickness of which is selected together with the shape of the lip, and the selection of plastics material, so that when an appropriate tube is inserted, the sharp corner 3 will be caused under compression to expand and rotate inwards and allow for the entry of the tube without excessive resistance, also without undue buckling.

The buckling can be said to be deformation about an axis orientated radially with respect to the central axis 6 of the fitting 2.

Accordingly by providing the so-called triangular or wedge shape in cross-section of the lip 1, there is provided this inner stiffness while having this connected to a portion of the housing through a portion of significantly reduced thickness at 10, allows adequate pivotal freedom.

It will be very clear that the characteristics of both the plastic material, the thickness, the respective angles and the shape of each part, all go toward making this fitting work for a selected tube.

It is a feature as shown in the drawings that the fitting is integrally moulded from plastics material and according to this embodiment this is selected from a plastics material having an elongation at break of at least 200%.

Such a material is a polyester sold commercially under the trade mark "Valox 325" which has an elongation at break of 300% as well as good tensile and compressive strength and low creep.

Such a material is appropriate for manufacturing a fitting according to this invention where a tube circular cross-section is made from linear low density polythene.

In order to ensure that the lip 1 with the entry of a tube does not ensnare and go past a preferred position, there are provided a plurality of tails 11 which are separated by slots 12 each of the tails being integrally secured to and forming part of the lip 1, but the segmentation allows the relative movement both compression and expansion of the lip 1, together with the pivoting about the portion of reduced thickness at 10, to occur without undue restriction.

The effect of each of the tails is therefore in the one instance to limit, with entry of a tube 13 the extent of forward pivoting of the lip 1 as is shown in FIG. 4, and in the instance of attempted removal of the tube 13, as shown in FIG. 5, the tail can eventually engage against portion 14 of the fitting 1, the shape and position of which is selected so that the sharp corner 3 will not have past further toward an entry into the fitting 1 than the pivot axis nominally shown at 15 about which it pivots.

It will now be seen from the description of the preferred embodiment that by provision of a lip portion which is integrally attached to the housing but is sufficiently stiffened to resist deformation but nonetheless because of the selection of plastic and the sahpe will be able to expand and contract modestly, while, however, allowing pivotal freedom about the portion of reduced thickness, allows for pivotal freedom providing a very effective sealing and gripping effect when required.

The remainder of the fitting 2 includes internal thread portion 16 and protrusions 17 by which the fitting 2 can be held against rotational action to secure a further fitting in the threaded portion.

Such additional features, however, are entirely optional.

In respect of each tail 11, the inner surface 18 is aligned to be 1° less flared than the inner surface 7 of the lip 1.

The angular relationships are otherwise as shown in the drawings in respect of the preferred embodiment, which is shown approximately twice full-size for a conventional fitting.

The naturally existing position as shown in FIGS. 1, 2 and 3 shows that the innermost face of the lip 1 is shaped and positioned so as to provide an inwardly tapering shape when without a tube therein as in FIGS. 4 or 5.

It is noted that the frusto-conical shape 5 defined by the inner face of the lip 1 can according to a broader concept define an angle which is within the range of 28° to 46°.

In the preferred embodiment this is 36°.

I claim:

1. An annular fitting facilitating a sealing connection with a tube to provide a liquid seal, the fitting having an aperture to receive a tube therein, the fitting being comprised of a plastic material and having a circumferentially continuous inwardly extending lip integral with a housing of the fitting, the lip having an inner end and being attached to the housing by a portion between the inner end of the lip and the housing of reduced thickness as compared to the thickness of the lip further toward the outer end of the lip and adapted thereby and by the position of such reduced thickness portion to be pivotal about such portion of reduced thickness.

2. A fitting facilitating a sealing connection with a tube to provide a liquid seal, as in claim 1 further characterised in that the lip has an inner most face which is of continuous and constant shape.

3. A fitting facilitating a sealing connection with a tube to provide a liquid seal, as in claim 2 further characterised in that the innermost face of the lip is shaped and positioned so as to provide an inwardly tapering shape when without a tube therein.

4. A fitting facilitating a sealing connection with a tube to provide a liquid seal, as in claim 3 further characterised in that the lip has tail segments extending from the lip toward an entry end of the fitting and are adapted to move with the lip and to limit the extent of pivotal movement of the lip by engaging a tube entering the fitting.

5. A fitting facilitating a sealing connection with a tube to provide a liquid seal, as in claim 4 further characterised in that the lip has a sharp radially innermost corner positioned and adapted so as to provide for an increasing gripping effect upon withdrawal of a tube held within the fitting.

6. A fitting facilitating a sealing connection with a tube to provide a liquid seal, as in preceding claim 4 further characterised in that each tail segment has an inner face substantially aligned with the innermost face of the lip.

7. A fitting facilitating a sealing connecting with a tube to provide a liquid seal, as in preceding claim 4 further characterised in that each tail segment has an outer face shaped and positioned with respect to the lip and the housing so as to provide a limit to the pivotal movement of the sharp corner of the lip such that this will be restricted from moving further toward the entry end of the fitting than the pivot axis about which it pivots.

8. A fitting facilitating a sealing connection with a tube to provide a liquid seal, according to claim 4 further characterised in that an innermost face of the lip defines a frustro-conical shape the angular relationship of th sides of which define therebetween an angle in the range of 28° to 46°.

9. A fitting facilitating a sealing connection with a tube to provide a liquid seal, as in the last preceding claim further characterised in that the angle is approximately 36°.

10. A fitting facilitating a sealing connection with a tube to provide a liquid seal, as in claim 4 further characterised in that the lip is in the form of a wedge shape in cross-section.

11. An arrangement for facilitating a sealing connection with a tube to provide a liquid seal, comprising the combination of a fitting as characterised in claim 1 and a tube located within the fitting such that the lip is engaging against the outer surface of the tube providing a sealing engagement thereby between the tube and the fitting.

12. A fitting as in claim 1 where the fitting has an entry end; the lip has a frusto-conical surface extending away from said entry end and terminating in a sharp inner corner which is adapted to dig into the periphery of the tube held within the fitting and resist withdrawal of the tube from the fitting.

13. An annular as in claim 1 providing for a sealing connection with an appropriately shaped hose, the fitting being integrally and uniformly formed of a plastics material of a type such that the portion of reduced thickness will provide a pivotal effect and the inner portion of the lip, while being sufficiently stiff to substantially resist deformation about an axis radially aligned with respect to the fitting, is able to expand and contract circumferentially.

14. A fitting providing for a sealing connection with an appropriately shaped hose, the fitting having a radially inwardly extending lip which has an innermost portion which is integrally connected to a surrounding housing by a portion of reduced thickness in relation to the remainder of the length of the lip, the fitting being integrally formed of a plastics material of a type such that the portion of reduced thickness will provide a pivotal effect and the inner portion of the lip while being sufficiently stiff to substantially resist deformation about an axis radially aligned with respect to the fitting while being able to expand and contract circumferentially.

15. A fitting as in claim 14 wherein on end of the fitting normally is that into which the end portion of a hose is inserted to be slid into engagement with said lip, said lip having a flat radially inner surface defining a conical shape pointing away from said one end to form a sharp radially inner edge that initially contacts the periphery of a said hose when slid into the fitting to tend to expand said lip and pivot said lip about said portion of reduced thickness whereby said edge engages the periphery of the tube and resists withdrawal of the tube when it is attempted to be slid out of said one end of the fitting.

* * * * *